UNITED STATES PATENT OFFICE.

FERDINAND BLUMENTHAL, OF BIEBRICH, GERMANY.

BAKING-POWDER.

No. 883,165.   Specification of Letters Patent.   Patented March 31, 1908.

Application filed July 20, 1907. Serial No. 384,814.

*To all whom it may concern:*

Be it known that I, FERDINAND BLUMENTHAL, a subject of the German Emperor, and resident of Biebrich-on-the-Rhine, Prussia, Germany, have invented a certain new and useful Improvement in Baking-Powder, of which the following is a specification.

Previously known baking powders contain, besides the usual bi-carbonate of soda for liberating carbonic acid, either acid salts of tartaric acid or lactic acid. I have now found that instead of these salts glycolic acid or its acid salts can be used whereby the advantage is obtained that the same mixture by weight of the said ingredients of the new baking powder yields a greater amount of carbonic acid than that given by acid ingredients of baking powder previously in use. This glycolic acid has the formula $$\underset{|}{\text{OH}} \\ \text{CH}_2\text{.COOH.}$$

The use of glycolic acid has the advantage that its taste is similar to citric acid so that foods baked with the new baking powder are more pleasing to the palate than those baked with tartaric acid or lactic acid baking powder.

As suitable salts the acid salts of glycolic acid and alkalies or alkaline earths can be used e. g. acid glycolate of soda, or of potash or lime. Glycolic acid is much cheaper than the other acids mentioned, which is also an important feature of the invention.

The reaction of the glycolic acid with bi-carbonate of soda is expressed by the following equation:—

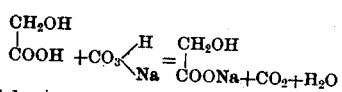

Suitable proportions of the ingredients for making baking powder according to the invention are as follows:—(1) 17.4 parts acid sodium glycolate in the form of dry crystals, 8.4 parts bicarbonate of soda, and 7. parts of starch powder, or (2) 19 parts acid potassium glycolate, 8.4 parts sodium bicarbonate and 7 parts of starch.

Having described my invention what I claim and desire to secure by Letters Patent of the United States is:—

1. Baking powder composed of glycolic acid and bi-carbonate of soda, substantially in the proportions described.

2. Baking powder composed of bi-carbonate of soda and acid salts of glycolic acid, substantially in the proportions described.

In testimony whereof I have signed my name to this specification in the presence of two subscribing witnesses.

FERDINAND BLUMENTHAL.

Witnesses:
 MORITZ WETZEL,
 HEINRICH KREIS.